March 9, 1926.  1,575,976
E. W. DAVIS
LUBRICATING SYSTEM
Filed Jan. 14, 1924    3 Sheets-Sheet 1
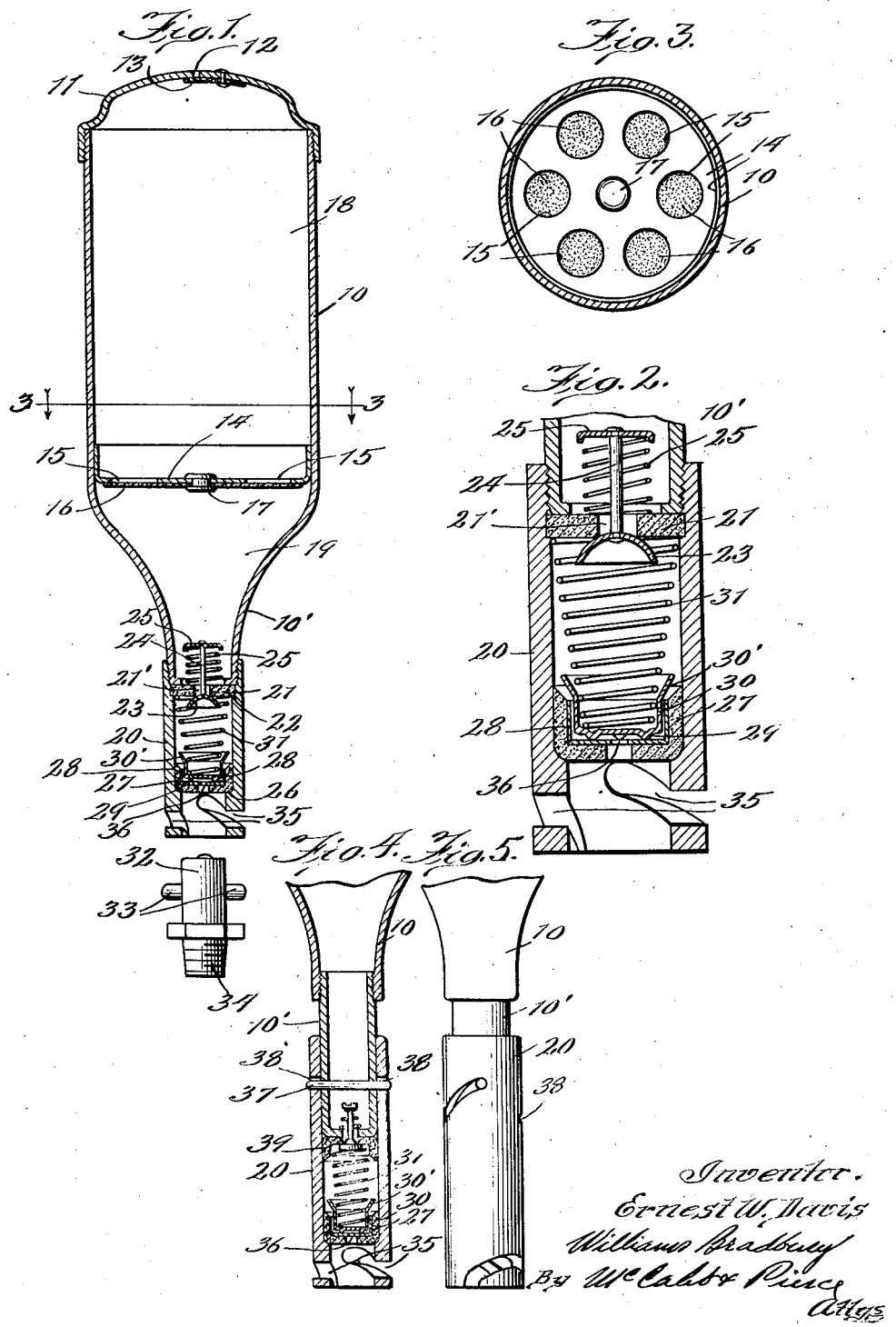

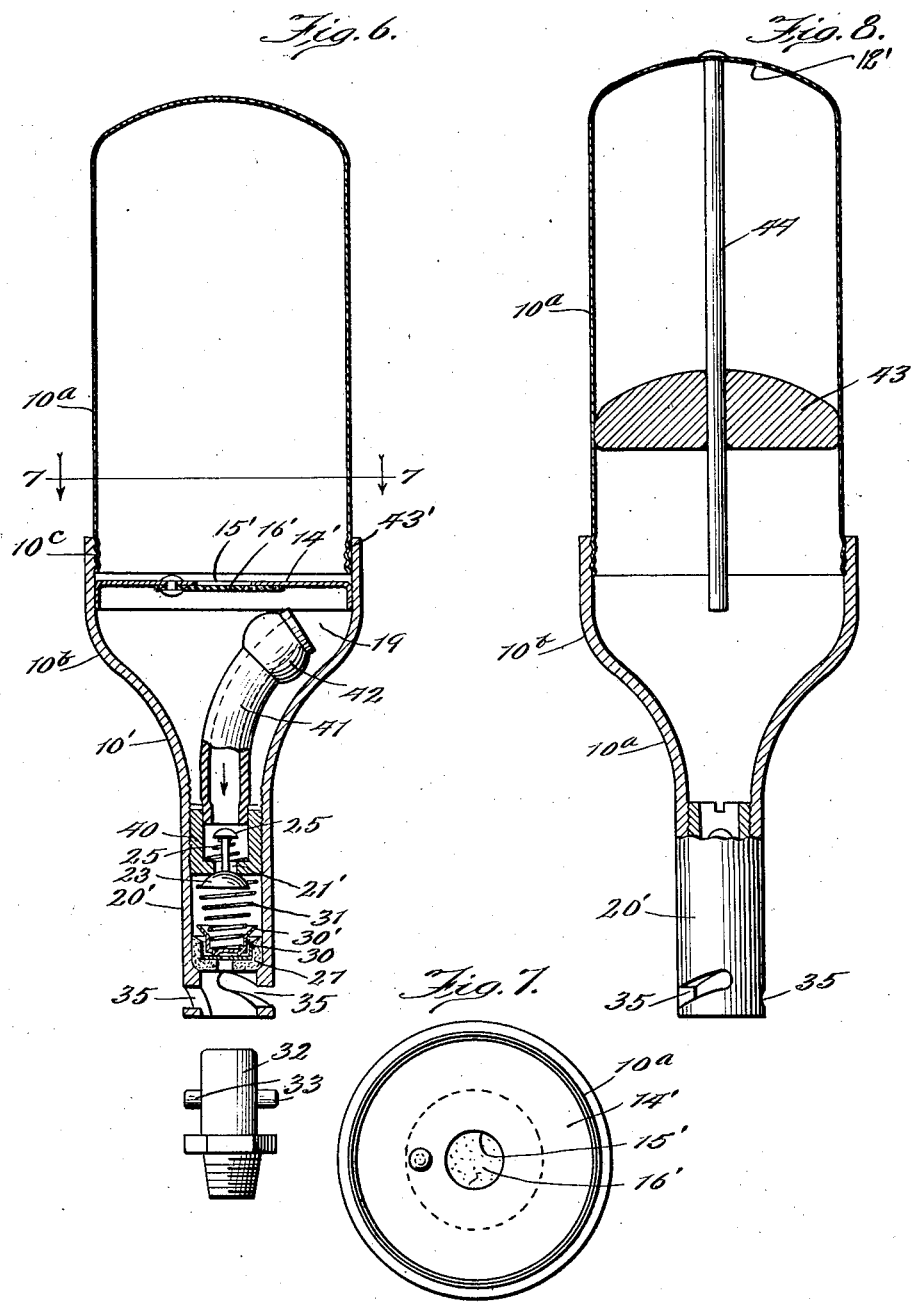

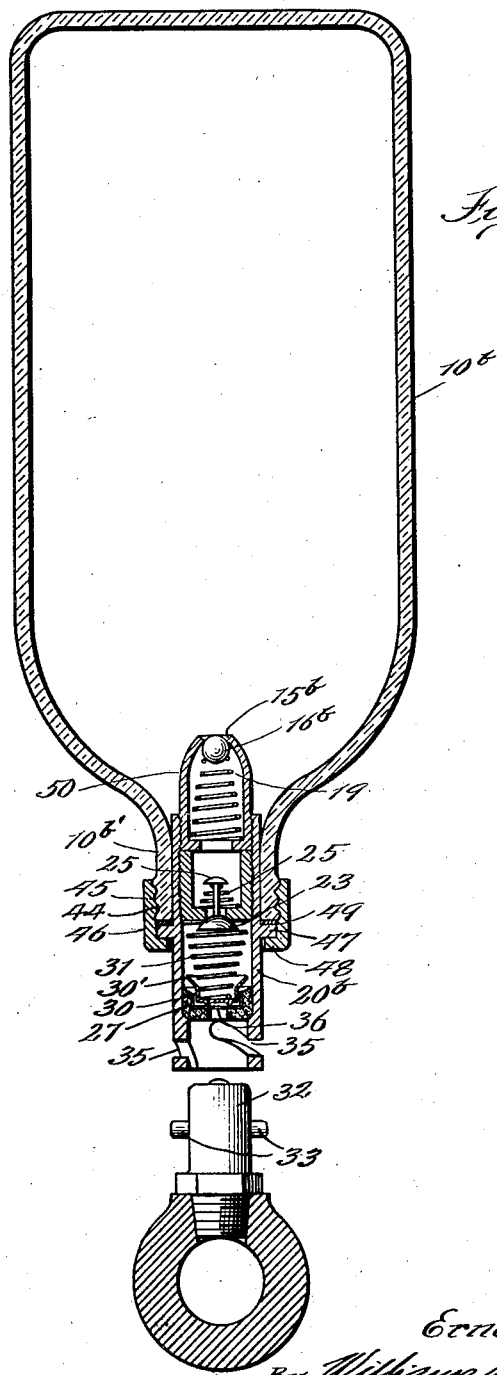

Patented Mar. 9, 1926.

1,575,976

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed January 14, 1924. Serial No. 686,061.

*To all whom it may concern:*

Be it known that I, ERNEST W. DAVIS, a citizen of the United States, and resident of Oak Park, in the county of Cook and State of Illinois, have invented a certain new and useful Improvement in Lubricating Systems, of which the following is a full, clear, concise, and exact description, reference being had to the accompanying drawings, forming a part of this specification.

My invention relates to improvements in lubricating systems, and is particularly concerned with improvements in that type of lubricating system comprising a plurality of fittings, one of which is adapted to be secured to each of the bearings to be lubricated, and a compressor for supplying lubricant under pressure to said fittings comprising means for placing the lubricant under pressure, and means for effecting a sealed connection with the fittings.

The objects of my present invention are:

First, to provide a lubricating system of the character described, comprising a compressor so constructed that the operations of connecting the compressor in sealed relation with a fitting and of developing pressure upon the lubricant in the compressor can be accomplished by one hand;

Second, to provide a compressor of the character described, in which the fitting coacts with the compressor to develop pressure upon the lubricant supplied to the fitting;

Third, to provide a compressor such as described, in which the pressure is developed by movement of a portion of the compressor, the other part of the compressor being secured to or held immovable by the fitting;

Fourth, to provide a compressor of the character described, which cannot become air-bound;

Fifth, to provide a compressor for handling either fluid or plastic lubricants; and Sixth, to provide a compressor which is simple in construction, economical to manufacture, and by means of which the lubricant can easily be placed under high pressure.

Other objects of my invention will appear as this description progresses, reference being had to the accompanying drawings, in which—

Figure 1 is a central longitudinal section through a compressor, embodying my invention;

Figure 2 is a central longitudinal section on an enlarged scale, showing certain details of construction of the compressor;

Figure 3 is a transverse section taken on line 3—3 of Figure 1;

Figure 4 is a view similar to Figure 2, but showing a modified form of my invention;

Figure 5 is a side elevation of the construction shown in Figure 4;

Figure 6 is a central longitudinal section through another embodiment of my invention;

Figure 7 is a transverse section taken on line 7—7 of Figure 6;

Figure 8 is a view partially in side elevation and partially in longitudinal section, showing another modification of my invention; and Figure 9 is a central longitudinal section through still another modification of my invention.

Throughout the several views similar reference characters will be used for referring to similar parts.

The embodiment of my invention illustrated in Figures 1, 2, and 3 comprises a barrel 10 having a removable cap 11 which is provided with an air vent 12 and a spring pressed valve 13 for closing same. The end of the barrel 10 opposite the cap 11 is tapered as shown at 10' to provide a discharge conduit. A flanged partition 14, positioned adjacent the large end of the tapered portion of the barrel and provided with a plurality of spaced ports 15 which are closed by the leather disc flap valve 16 secured thereto by means of the rivet 17, divides the compressor barrel into a storage reservoir 18 and a priming chamber 19.

A sleeve 20 is threaded onto the outer end of the discharge conduit 10' and a centrally apertured fibre disc 21 is clamped between the shoulder 22 on the sleeve 20 and the end of the discharge conduit 10' of the compressor. A curved valve 23 is adapted to close the port 21' in the fibre disc 21, and is provided with a stem 24 which projects through the port 21' and terminates in a head 25', between which and the fibre disc 21 is confined a compression spring 25 which yieldingly holds the valve 23 in its closed position. The bore of the sleeve 21 is contracted adjacent its outer end to form a shoulder 26 which acts as a seat for the centrally apertured cup leather 27. A centrally apertured metal cup 28 seated within the cup leather 27 provides means for preventing the flange or side wall of the cup leather 27 from becoming deformed under the immense pressure to which it is subjected, and also acts as an abutment or support for the several spaced projections or bosses 29 on the bottom of the metal cup 30, which tapers outwardly to a point adjacent the wall of the sleeve 20 as shown at 30'. A compression spring 31 located between the bottom of the cup 30 and the fibre disc 21 provides means for yieldingly holding the projections 29 in contact with the bottom of the cup 28, and also for holding the cup leather 27 in its outermost position.

The embodiment of my invention described above is intended to be used for filling lubricant receiving fittings of the type shown at 32, which is provided with a pair of projections 33 extending from opposite sides thereof, and with a screw threaded portion 34 adapted to screw into the bearing to be lubricated. Fittings of this type are in general use upon automobiles, tractors, trucks, industrial machinery, etc., and a detailed description thereof is for that reason unnecessary.

The outer end of the sleeve 20 is provided with a pair of oppositely disposed inclined slots 35, which are adapted to receive the projections 33. These slots extend inwardly from the outer end of the sleeve 20 to a point immediately adjacent the bottom of the cup leather 27 and are so proportioned that when the pins 33 have fairly entered these slots, the end of the fitting 32 will contact with the bottom of the cup leather 27. From this description, it will be apparent that when the barrel 10 of the compressor is rotated in the proper direction, the sleeve 20 will be threaded onto the pins 33, thereby causing the end of the fitting 32 to push the cup leather and its associated parts inwardly, and that if the space between the cup leather and the fibre gasket 21 has previously been filled with lubricant, this lubricant will be placed under pressure and thus forced into the fitting 32.

In using my improved compressor described above, it is first filled with oil while held in an upright position and the weight of this oil will be sufficient to open the flap valve 16, so that not only the reservoir portion of the barrel but also the priming chamber 19 will be filled. The spring 25 has very little tension, so that the weight of the oil when the barrel 18 is held in an upright position is sufficient to open the valve 23 and permit the chamber between the cup leather 27 and the disc 21 to be filled. The opening 36 in the bottom of the cup 28 is made quite small so that atmospheric pressure is sufficient to retain the oil in the chamber or cylinder just described. When this chamber becomes filled, the valve 23 will close and the operator can thereupon attach the sleeve 20 to a fitting as described above, and by rotating the barrel 10 relatively to the fitting can cause the latter to move inwardly in the sleeve 20, thereby placing the contents of this sleeve under compression and forcing it into the fitting 32.

It will, of course, be seen that before any inward movement of the cup leather 27 takes place, it will be held in sealing contact with the end of the fitting under the pressure of the spring 31, and that as it moves inwardly the pressure tending to hold it against the end of the fitting will increase as the pressure upon the lubricant increases. In this manner the gasket or cup leather 27 is forced not only to exert pressure upon the lubricant which is to be supplied to the fitting, but also to effect a seal between the compressor and the fitting so that the lubricant under high pressure can be supplied thereto without loss.

It frequently happens that in filling compressors such as described above, a certain amount of air will become trapped in the lubricant, and ultimately this air will reach the cylinder formed by the sleeve 20. Furthermore, as the lubricant is used from the barrel 10, air will enter the barrel through the port 12 and will ultimately find its way past the flap valve 16 and into the sleeve 20. Unless some means is provided for insuring the ejection of air from the sleeve or cylinder formed thereby, it will merely be compressed and then expand in the cylinder as the cup leather moves inwardly and outwardly during the operation of the compressor, and no lubricant will be delivered to the fitting. To avoid this action, I have provided the cup 30, the bottom of which is spaced very slightly from the bottom of the cup 28, the width of this space being in the neighborhood of one thirty-second ($\frac{1}{32}$) of an inch so that the lubricant must pass through this comparatively narrow space. Usually the fittings are located upon a mechanism in such manner that the compressor must be held in a horizontal plane. This means that if there is any air in the sleeve 20, it will occupy the upper portion of the sleeve. When the compressor is actuated to place the lubricant under pressure, the air will of course be placed under the same pressure, and as soon as it begins discharging through the fitting the superior expansible force of the air will assert itself and force its way through the opening in the bottom of the cup 28 and in the gasket in preference to the lubricant. This discharge of air will also be facilitated by the fact that the viscosity of air is less than of oil, and that it can therefore more readily pass through the openings in the cup leather and the cup 28. By oscillating the barrel several times, the operator can thus discharge all of the air from the sleeve or cylinder 20, and subsequent operation thereof will cause the oil to be forced into the fitting. It is to be understood that it is not necessary to force the air from the sleeve or cylinder 20 each time the fitting is to be operated, but that this operation becomes necessary at infrequent intervals.

One of the reasons for providing the priming chamber 19 is to prevent as much as possible the entry of air into the sleeve or cylinder 20. By holding the compressor in an upright position after the filling of each fitting, the chamber 19 can be maintained entirely filled with oil and will remain filled with oil even though the compressor be then placed in a horizontal position or with the sleeve 20 uppermost. In this manner it is possible to exclude air from the cylinder 20.

The embodiment of my invention shown in Figures 4 and 5 is similar to that described above, except that the discharge conduit 10' in place of being rigidly secured to the sleeve 20, is reciprocably mounted in the inner end of this sleeve, and is secured thereto by means of a pin 37 which operates in two oppositely disposed cam slots 38. Otherwise, the construction of this modified form of my invention is similar to that described above, except that a cup leather 39 is used for sealing the joint between the sleeve 20 and the end of the discharge conduit 10'. The sleeve 20 is provided at its outer end with the inclined or cam slots 35, which in this case have a somewhat smaller pitch than the slots 38. With this construction, when the outer end of the sleeve 20 is brought into co-acting relation with the fitting and the barrel of the compressor is rotated, the projections 33 on the fitting will first move into the slots 35, because these slots having a smaller pitch than the slots 38 will offer less resistance to the movements of the projections 33 than the slots 38 will offer to the movements of the ends of the pins 37. In this manner the gasket 27 is forced inwardly, thereby discharging a portion of the lubricant from the sleeve 20, and when this movement has been completed, further rotation of the barrel 10 causes the outer end of the discharge conduit 10' to be forced into the sleeve by the action of the slots 38 and the ends of the pin 37, thereby expelling a further quantity of lubricant from the cylinder 20. Upon turning the barrel in the opposite direction the parts will assume their former position, and a new supply of lubricant will be drawn into the sleeve 20.

The embodiment of my invention shown in Figures 6 and 7 is similar to that described above, except here the barrel is formed of two parts 10ª and 10ᵇ, the first of which is merely a tin container intended to be sold to the consumer filled with oil. The cover can be removed from this container so that the portion 10ᵇ can be secured thereto by the screw threaded connection 10ᶜ. In this embodiment of my invention the partition 14' is located in the portion 10' of the barrel and provided with a central aperture 15' closed by the flap valve 16'. The sleeve 20' is also shown as being integrally formed with the discharge conduit 10'.

A hard fibre sleeve 40 is screwed into the inner end of the discharge conduit 10' and has an end portion 21' corresponding to the fibre disc 21 of the embodiment shown in Figures 1 and 2, and a flexible tube 41 has one end secured in the inner end of the sleeve 40 and its other end loaded by means of an iron or lead sleeve 42, so that the inner end of this tube is free to seek the lowest portion of the priming chamber 19 when the compressor is held in a substantially horizontal position and thus insure a supply of lubricant free from air to the sleeve 20'.

A supply of air to the barrel 10ª for replacing the oil removed from the barrel can be insured by cutting a small groove 43' transversely of the threads in the portion 10ᵇ of the barrel. While this groove will insure a supply of air to the interior of the reservoir 10ª, it will not be large enough to permit an appreciable escape of lubricant therefrom.

In Figure 8 I have illustrated a modified form of my invention which is adapted to supply grease or other plastic or semi-plastic lubricants to the fittings. This embodiment differs from that shown in Figure 6 in that it omits the partition 14' and substitutes therefor a follower 43 which is slidably mounted in the barrel 10ª and guided by means of the rod 44, the outer end of which is secured to the end of the barrel 10ª. A port 12' permits access of air to the barrel 10ª as the lubricant is withdrawn therefrom. In the operation of this gun, the first few movements or oscillations thereof causes the air to be withdrawn from the sleeve 20', thereby forming a vacuum therein, and atmospheric pressure exerted upon the outer face of the follower 43 causes it to move inwardly and force lubricant into the sleeve 20', from which it is discharged upon subsequent oscillation of the compressor.

The embodiment of my invention shown in Figure 9 is similar to that shown in Figure 6, except that it is designed to permit the sale of oil in glass bottles forming the cylinder 10ᵇ, the neck 10ᵇ' of this bottle being provided with threads 44 to be received by the follower 46 threaded at 45 which is rotatably mounted upon the sleeve 20ᵇ. An annular rib 47 extends outwardly from the sleeve 20ᵇ and is engaged by the flange 48 on the sleeve 46. By these means the sleeve 20ᵇ can be secured to the neck of the bottle 10ᵇ. I prefer to employ a gasket 49 for sealing the joint between the neck of the bottle and the sleeve 20ᵇ.

In place of the partition 14' of Figure 6, I prefer to form the priming chamber 19 by means of the nipple 50 which is secured to the inner end of the sleeve 20, and which contains an inlet port 15ᵇ closed by the ball 16ᵇ, which is yieldingly held in its closed position by means of the spring 52. This embodiment of my invention operates in substantially the same manner as those disclosed in the remaining figures, and for that reason a detailed description of this mode of operation is unnecessary.

While I have described the details of construction of the preferred embodiments of my invention, it is to be clearly understood that my invention is not limited to these details, but is capable of other adaptations and modifications within the scope of the appended claims.

Having thus described my invention, what I claim is:—

1. The combination with a fitting having a projection extending from one side thereof, of means for supplying lubricant to said fitting, comprising a barrel having a discharge opening at one end, a partition extending across said barrel adjacent said discharge opening, said partition forming a priming chamber adjacent said discharge opening and a reservoir remote therefrom, said partition having a valved opening permitting the passage of lubricant from said reservoir to said priming chamber, a sleeve secured to said barrel and communicating with said discharge opening, an outwardly opening spring pressed valve controlling the passage of lubricant from said discharge opening into said sleeve, a centrally apertured cup leather slidably mounted in said sleeve, and a spring for yieldingly urging said cup leather in an outward direction, the outer end of said sleeve being provided with an inclined cam slot for receiving the projection on said fitting, the inner end of said cam slot terminating adjacent the bottom of said cup leather.

2. The combination with a fitting having a projection extending from one side thereof, of means for supplying lubricant to said fitting, comprising a barrel divided into a reservoir and a priming chamber, a sleeve secured to said barrel and communicating with said discharge opening, an outwardly opening spring pressed valve controlling the passage of lubricant from said priming chamber into said sleeve, a gasket slidably mounted in said sleeve, and a spring for yieldingly urging said gasket in an outward direction, the outer end of said sleeve being provided with an inclined cam slot for receiving the projection on said fitting.

3. The combination with a fitting having a projection extending from one side thereof, of means for supplying lubricant to said fitting, comprising a reservoir, a priming chamber communicating with said reservoir, a sleeve communicating with said priming chamber, an outwardly opening spring pressed valve controlling the passage of lubricant from said priming chamber into said sleeve, a perforated gasket slidably mounted in said sleeve, and a spring for yieldingly urging said gasket in an outward direction, the outer end of said sleeve being provided with an inclined cam slot for receiving the projection on said fitting, said cam slot being located adjacent the outer side of said gasket, whereby oscillation of said sleeve relatively to said fitting will cause reciprocation of said gasket.

4. A lubricant compressor comprising a lubricant reservoir, a priming chamber having a valved connection with said reservoir, a cylinder communicating with said priming chamber, an outwardly opening spring pressed valve controlling communication between said priming chamber and said cylinder, a gasket slidably mounted in the outer end of said cylinder and a cam on said cylinder for coacting with means for reciprocating said gasket.

5. A lubricant compressor comprising a lubricant reservoir, a priming chamber having a valved connection with said reservoir, a cylinder communicating with said priming chamber, a gasket slidably mounted in the outer end of said cylinder, and a cam on said cylinder for co-acting with means for reciprocating said gasket.

6. A lubricant compressor having a cylinder, one end of which is formed by a gasket which is adapted to make sealed contact with a fitting, and means for insuring the discharge of air from the rear of said gasket when the lubricant in said cylinder is placed under pressure, comprising a cup, the bottom of which is slightly spaced from said gasket and the flange of which extends to points in close proximity to the inner wall of said cylinder.

In witness whereof, I hereunto subscribe my name this 10th day of January, 1924.

ERNEST W. DAVIS.